United States Patent [19]

Harman et al.

[11] 3,807,011

[45] Apr. 30, 1974

[54] MACHINE TOOLS WITH AUTOMATIC TOOL CHANGE FACILITIES

[76] Inventors: Julius Harman, 9 Holly Walk, Baginton, Warwickshire; Michael Eric Norman, 14 Sandy Cres., Hinekley, Leicestershire, both of England

[22] Filed: Oct. 9, 1970

[21] Appl. No.: 79,618

[30] Foreign Application Priority Data
Oct. 9, 1969  Great Britain.................... 49570/69

[52] U.S. Cl. ............................................... 29/568
[51] Int. Cl............................................ B23q 3/157
[58] Field of Search............................ 29/568, 26 A

[56] References Cited
UNITED STATES PATENTS

| | | | |
|---|---|---|---|
| 3,601,886 | 8/1971 | Gohren et al......................... | 29/568 |
| 3,584,374 | 6/1971 | Spuhler................................. | 29/568 |
| 3,513,734 | 5/1970 | Burroughs et al. ................ | 29/568 X |
| 3,186,267 | 6/1965 | Pabst et al. .......................... | 29/26 X |
| 3,414,967 | 12/1968 | Erikson................................. | 29/568 |
| 3,667,114 | 6/1972 | Smith et al........................... | 29/568 |

FOREIGN PATENTS OR APPLICATIONS
2,031,219  6/1970  Germany............................... 29/568

*Primary Examiner*—Andrew R. Juhasz
*Assistant Examiner*—Z. R. Bilinsky
*Attorney, Agent, or Firm*—Holman and Stern

[57] ABSTRACT

A tool change machine tool incorporates a magazine in which there are a series of tool carrying devices, a slide on which tools are to be mounted has a dovetail track extending across its face and a track portion of the same cross-section is provided on each of the tool carrying devices and can be aligned with the dovetail track on the slide. A similar portion of dovetail track is formed on a piston which is used to draw together a locating device on a tool and a locating device on the tool mount. A slidable tool transfer member is slidable on the track portion on the slide and has a transverse track portion for interlocking engagement with a tool on a selected tool carrier.

12 Claims, 8 Drawing Figures

MACHINE TOOLS WITH AUTOMATIC TOOL CHANGE FACILITIES

BACKGROUND OF THE INVENTION

This invention relates to machine tools with automatic tool change facilities and it is an object of the invention to provide such a machine tool in a convenient form.

SUMMARY OF THE INVENTION

A machine tool in accordance with the invention includes a slide structure, tool mount means movably mounted on said slide structure for receiving tools for operating on a workpiece, a magazine for receiving a plurality of different tools for transfer to the tool mount means, said magazine including a plurality of tool carrying devices, each having thereon a track section with which a tool having a portion of complementary section can be interlockingly engaged and the tool mount means having a corresponding track section alignable with the track section on a selected tool carrying device, tool transfer means including a transfer member movable in a direction parallel to said alignable track sections and provided with a further track arrangement extending substantially perpendicularly to the alignable track sections and interlockingly engageable with a further complementary portion of the tool, a further track section on said slide structure alignable with the track sections on a tool carrying device and the tool mount means and slidedly supporting said transfer member and said tool mount means including a piston movable in a direction perpendicular to the direction in which said further track section on the slide structure extends, said piston having thereon the track section of the tool mount means.

In the accompanying drawings:

DETAILED DESCRIPTION OF THE INVENTION

Figure 1:
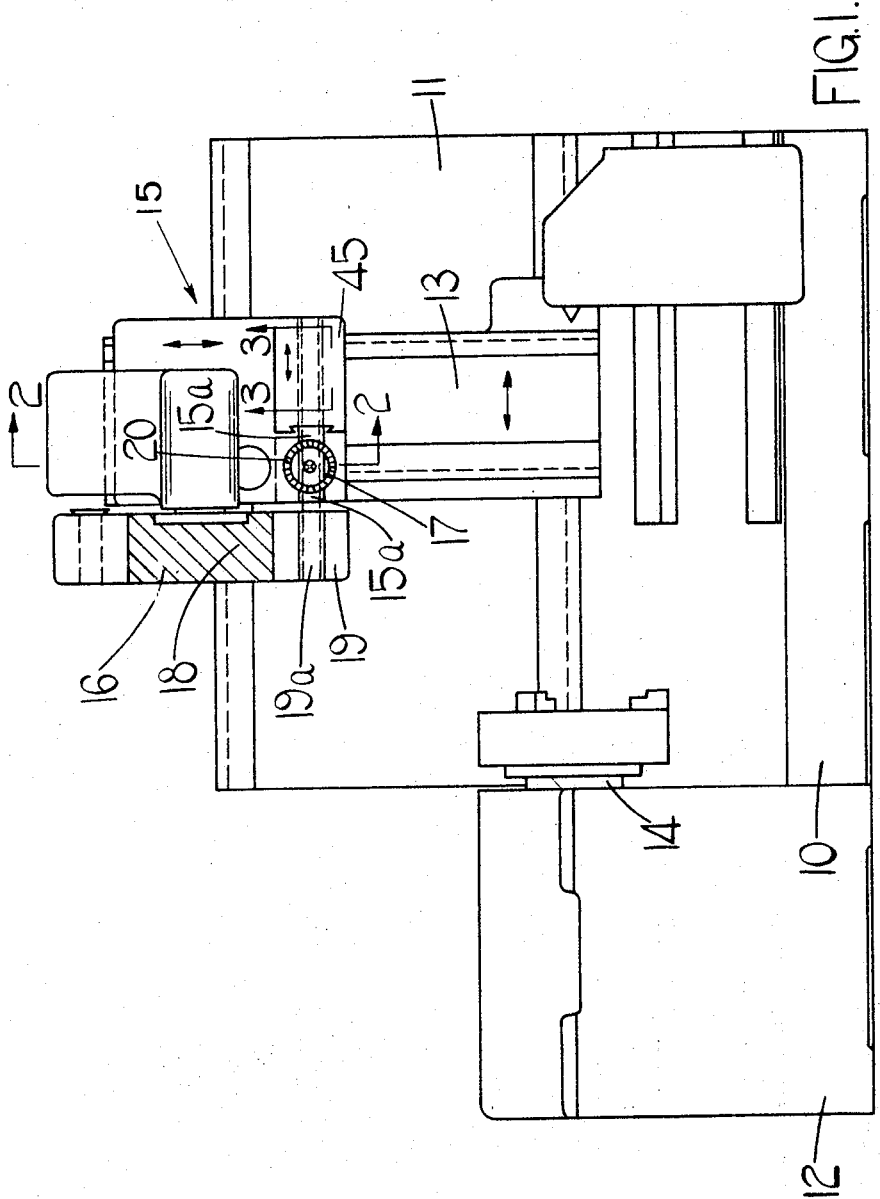
FIG. 1 is a diagrammatic elevation of a lathe to which an example of the invention is applied.
Figure 2:
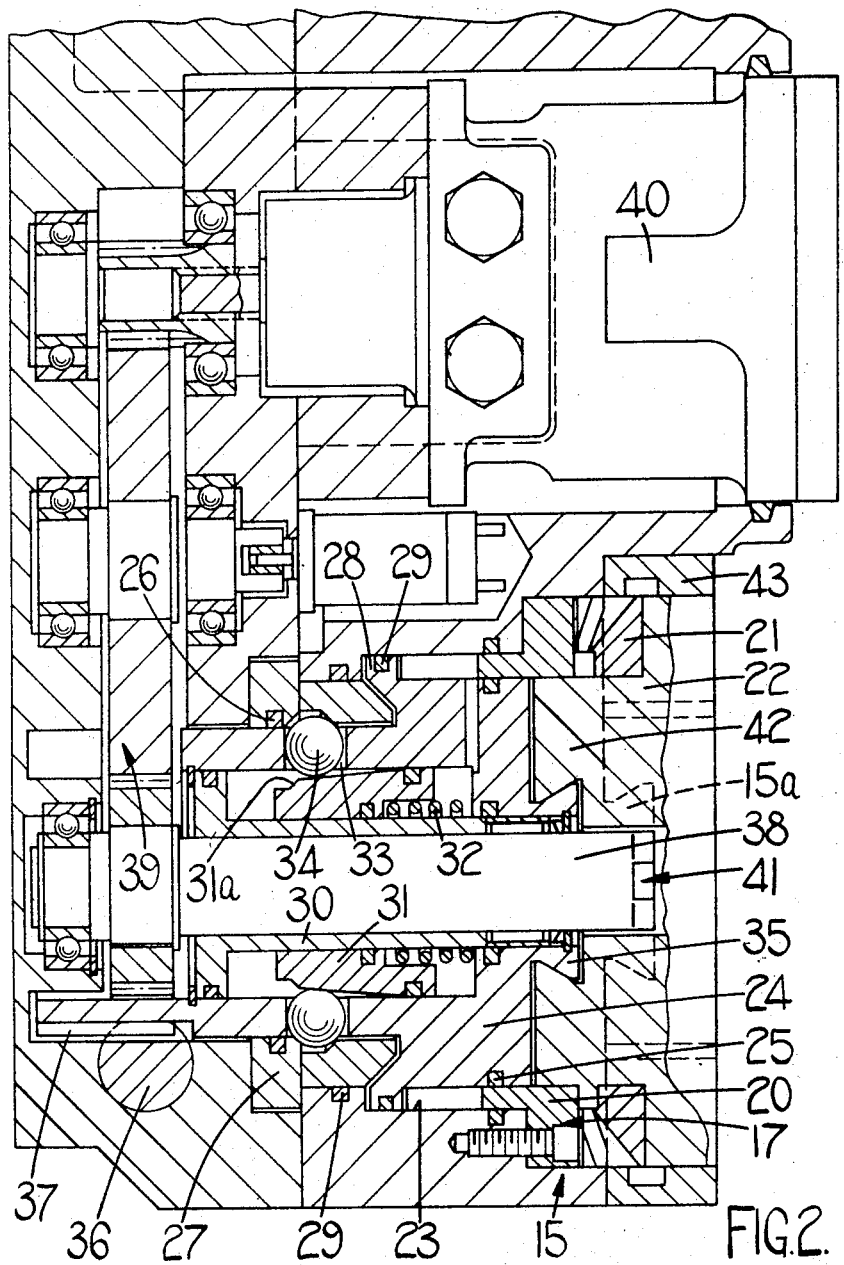
FIG. 2 is an enlarged fragmentary sectional view on line 2—2 in FIG. 1, the view looking in the direction of the arrows.
Figure 3:
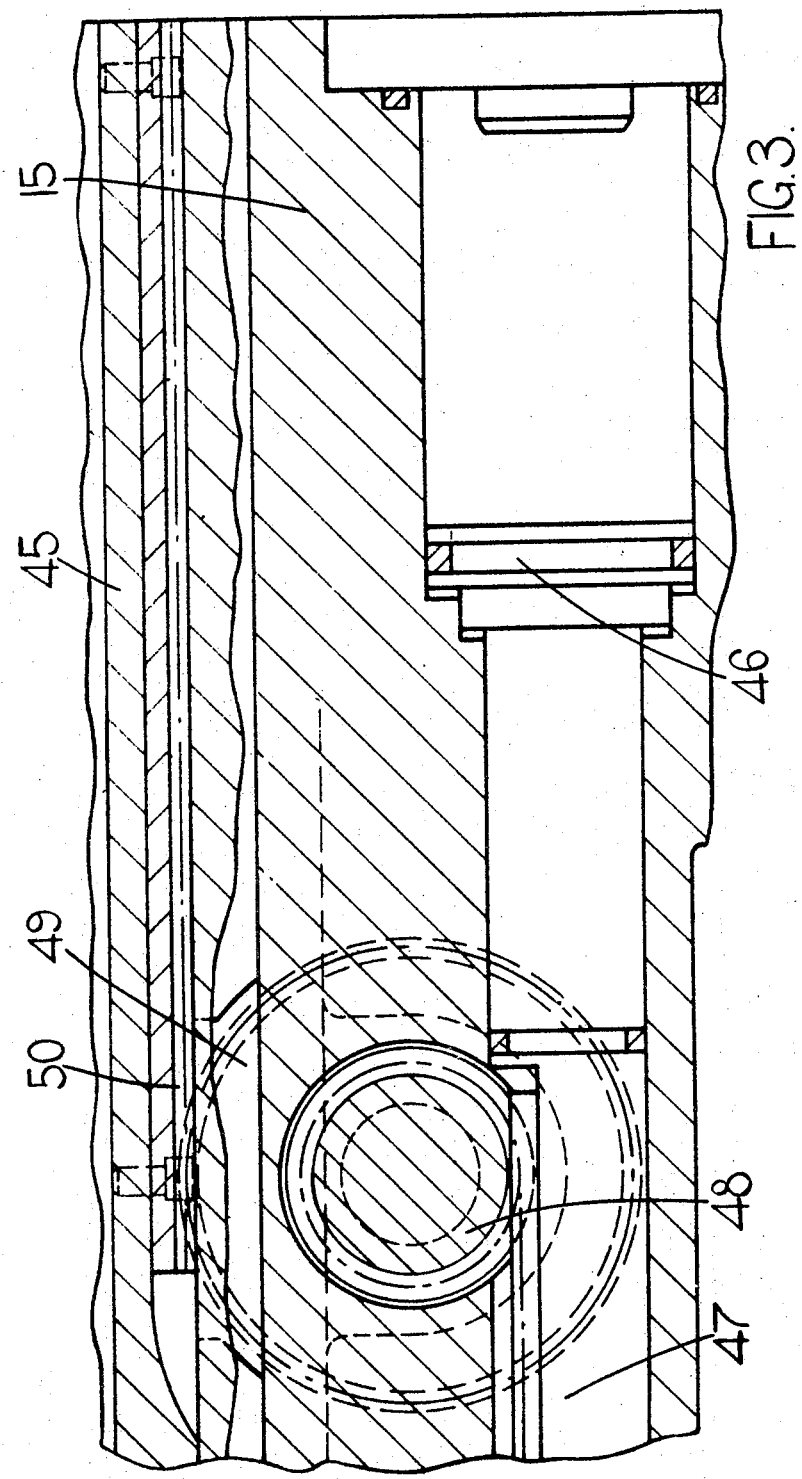
FIG. 3 is an enlarged fragmentary section on line 3—3 in FIG. 1, the view looking in the direction of the arrows.
Figure 4:
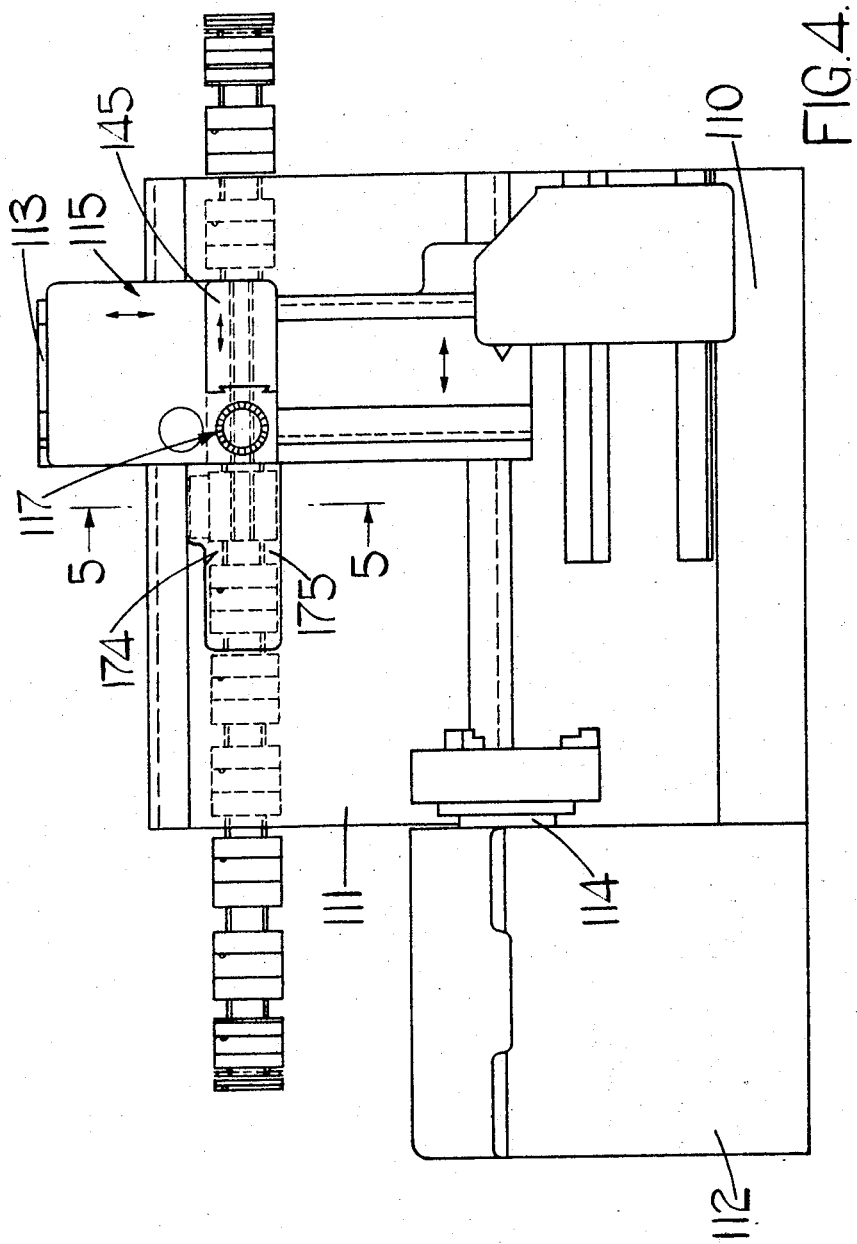
FIG. 4 is a diagrammatic elevation of a different lathe to which another example of the invention is applied.

Referring firstly to FIGS. 1 to 3, the lathe shown includes a frame made up of a plurality of sections attached together by bolts or in any other convenient way. Choice of appropriate sections from a range of sections enables lathes of widely differing geometries to be made up relatively simple.

In the present case there are a base 10 and a bed 11 of appropriate lengths, a headstock 12 fixed to the base 10, a saddle 13 slidable horizontally along the bed in a direction parallel to the axis of a headstock spindle 14, and a slide 15 vertically movable on the saddle 13. A tool magazine 16 is mounted on the saddle 13 and carries a plurality of tools (not shown) for transfer to a tool mount 17 on the slide 15.

The magazine 16 comprises a disc member 18 mounted for rotation on an axis spaced from and parallel to the spindle axis and a plurality of tool carrying devices 19 arranged around the periphery of the disc. Each tool-carrying device 19 has a track section 19a, of dovetail shape in cross-section, extending in a direction parallel to the spindle axis.

The slide 15 likewise has a track section 15a of similar shape extending across its face and, by movement of the slide to an appropriate position, the two track sections 15a, 19a can be aligned to form a substantially continuous track of dovetail section.

Turning to FIG. 2, the tool mount means 17 on the slide 15 includes a toothed locating device in the form of a ring 20 formed with teeth in one face. This ring can coact with a complementary ring 21 which is provided on an end 22 of each tool used in the machine. The ring 20 is fitted in the open end of a bore 23 in slide 15 and slidable in this bore is a piston 24 of stepped annular form. One end of the piston 24 has a seal ring 25 sliding in the ring 20 and the other end, being of smaller diameter, slides through a sealing ring 26 mounted on a member 27 fixed in the bore 23. Intermediate its ends, the piston has a flange 28 with a seal ring 29 sliding in the bore 23.

A tubular sleeve 30 extends through the interior of the piston 24 and a locking ring 31 is slidably mounted in an annular section space formed between the interior of the piston 24 and the exterior of the sleeve 30. The ring 31 is externally frusto-conically tapered in a direction towards the end of the piston 24 sliding in the sealing ring 26. At the smaller end of the ring 31 there is a steep frusto-conical shoulder 31a. A spring 32 urges the ring 31 in the direction of its taper.

The portion of the piston 24 between the sealing ring 26 and the flange 28 is formed with a series of radial bores 33 in which steel balls 34 are disposed. The diameter of each ball 34 is greater than the thickness of the wall of the piston. The member 27 is formed with an internal groove which receives the balls 34 as shown when the piston is retracted into the bore 23. The spring 32 urges the ring 31 to a position such that the relatively shallowly tapered portion of its surface engages the balls and thrusts these outwardly to lock the piston firmly in its retracted position.

When it is required to move the piston out of its retracted position, fluid under pressure is introduced into the bore through a port (not shown) in the member 27. Pressure then acts on the ring 31 since fluid can pass through the bores 33 and displaces the ring 31 against its spring loading. It is to be noted that there is a drilling through the piston 24 between the end thereof adjacent the seal ring 25 and its interior at the larger end of ring 31. Displacement of the ring 31 permits the inward movement of the balls 34 which must accompany displacement of the piston 24 resulting from the application of fluid pressure to the flange 28 of the piston.

The end of the piston opposite the seal ring 26 is formed across its face with a dovetail track portion 35 of the same section as the track portions 15a and 19a. When the piston 24 is at the end of its stroke opposite the retracted position shown in FIG. 1 the dovetail track portion 35 is aligned with dovetail track section 15a.

The piston 24 is rotatable about its axis by a rack 36 engaging elongated pinion teeth 37 formed on an extension of the piston 24. The arrangement is such that a hydraulic piston and cylinder unit (not shown) which drives the rack 36 can turn the piston through 90° between a position in which the dovetail track section 35 is orientated for alignment with the dovetail track section 15a and a position in which the section 35 is orientated at right angles to its other position.

The sleeve 30 receives a drive shaft 38 for imparting a drive to any rotary tools which may be used on the tool mount 17. The drive shaft 38 is coupled by gearing 39 to a hydraulic motor 40. One end of the shaft 38 is formed as indicated at 41 for making a driving connection with a corresponding shaft or rotatable part of the tool in question.

As mentioned above, the tool end portion 22 has a toothed locating ring 21 thereon which mates with the toothed locating ring 20 secured to the slide 15. The number of teeth on each ring is divisible by four so that it is possible for the rings to be operatively interengaged in two relative orientations differing by 90°.

The tool end 22 has a spigot portion 42 in the end of which there is a diametral dovetail groove. The spigot portion 42 fits closely inside the ring 20. Slidably mounted on the tool end is a shroud 43 which surrounds the ring 21. This shroud 43 can slide to a position in which a dovetail groove across its face is aligned with the groove in the spigot portion 42, in which position the shroud serves to protect the toothed locating ring 21 from foreign matter.

Thus, it will be seen that, when the dovetail track portions 15a on the slide, 35 on the piston and 19a a tool carrier of the magazine are all aligned to form a single substantially continuous track, and the tool can be slid along such track between the tool carrying device and the tool mount means. For effecting such sliding motion of the tool, there is provided on the slide 15 a tool transfer means which comprises a slider 45 which actually runs on the dovetail track section 15a. As shown in FIG. 3, this slider 45 is propelled along the track 15a by a piston and cylinder unit 46. A piston rod 47 of this unit has rack teeth engaging the smaller part 48 of a compound pinion. The larger part 49 of the compound pinion engages rack teeth 50 on the slider 45. As shown in FIG. 1, one end of the slider 45 is formed with a dovetail groove 51 which runs in a direction substantially perpendicular to the dovetail track 15a and to the axis of the locating ring 20. The shroud 43 of each tool has a complementary dovetail which can be received by the groove 51.

The sequence of operations during a tool change is as follows:

The slide 15 is brought to appropriate tool change position to align the dovetail track section 19a of an empty tool carrying device in the magazine with the dovetail track section 15a. The tool is then released by moving the piston 24 out of its retracted position as described above. If necessary, the piston 24 is then turned to align the dovetail track portion 35 on the piston with the already aligned dovetail track portions 15a, 19a. The slider 45 is then displaced to the left as seen in FIG. 1 to slide the tool from the tool mount 17 to the tool carrying device 19, where a suitable locking device (not shown) is actuated to hold the tool on the tool carrying device. The magazine disc 18 is now turned so that the dovetails on successive shrouds pass through the groove 51 in the slider until the disc is arrested with the next tool required presented to the slider 45. The tool is selected by any one of a plurality of different methods currently in use, i.e. the tool may have a code element associated with it which is read by a reading head and compared with a desired code or the control equipment may merely turn the disc 18 to a specified position.

The slider 45 is then moved back to its original position, thereby sliding the newly selected tool from the magazine to the tool mount. The piston 24 may then be turned if required, before being retracted to lock the new tool on the tool mount means 17.

It will be appreciated that the arrangement described above, allowing any tool to be mounted simply and accurately in two alternative positions by utilizing the properties of the toothed locating rings, enables radial and axial drilling to be carried out without difficulty.

In addition, the facility described may be utilized to extend the effective number of turning tools available on the machine since each tool may be provided with two differently arranged tips.

The actual transfer operation is carried out rapidly and does not involve either the complicated mechanisms used in the more sophisticated of present day tool changers, or the alternative use of slide and saddle or magazine movements to effect tool changing.

In a modification of the above described machine, the magazine is mounted on the headstock, so that positioning of both the slide and the saddle is necessary for a tool change operation.

Turning now to the machine shown in FIGS. 4 to 8, the lathe is composed of basically similar components, i.e., a base 110, a bed 111, a headstock 112 etc. A slide 115, with its tool mount 117 and tool transfer slider 145, is exactly the same as that described above. Tool storage capacity has, however, been extended considerably by utilizing a different form of tool magazine disposed behind the bed 111 of the lathe.

Figure 8:
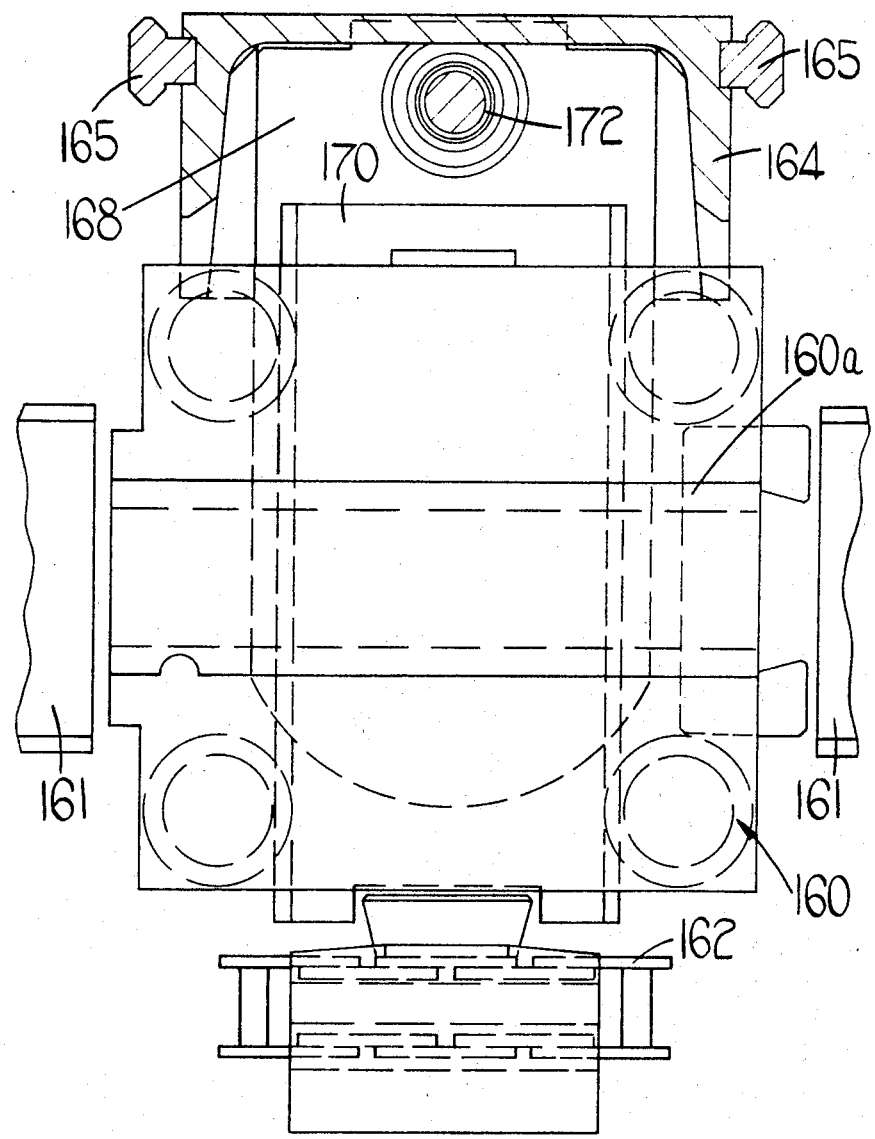
FIG. 8 is an enlarged section on line 8—8 in FIG. 5, the view looking in the direction of the arrows; the tools shown in FIG. 5 being omitted in FIGS. 6, 7 and 8.

The magazine actually consists of a plurality of trolleys 160 running on rollers on a rail 161 (FIG. 8). This rail is interrupted at one position only, but when the gap is bridged as will be hereinafter explained forms a closed path around which the trolleys 160 are moved when required by a continuous chain 162 as will also be hereinafter explained.

At the gap in the rail 161 there is a tool transfer mechanism 163 which comprises a carrier beam 164, which, as is shown in FIG. 8, is of inverted channel-shaped form. Attached to the depending side flanges of the beam 164 are a pair of runners 165 extending along the full length of the beam and running on rollers 166 mounted on brackets on the bed structure 111. The beam 164 is movable longitudinally in a horizontal direction perpendicular to the headstock spindle axis by a suitable drive device such as an elongated piston and cylinder unit (not shown). An indexable stop drum (not shown) is provided on the beam 164 for determining the various positions along its travel at which this beam is arrested in operation.

Adjacent one of its ends, the beam 164 has a pair of depending lugs 168 and 169 on which there are mounted a pair of sections 170 and 171 respectively of the rail 161. Each such section is adapted to fit into the gap in the rail when the beam 164 is in an appropriate position. Each section 170, 171, is rotatable about an axis parallel to the length of the beam and the lug 168 has mounted thereon a vane-type actuator 173 for turning the rail sections, with these being drivingly interconnected by gearing (not shown) in the lugs 168, 169 and a connecting shaft 172 (FIG. 8) immediately beneath the web of the beam 164.

Each of the trolleys 160 has a dovetail track section 160a running thereacross which extends vertically when the trolley is in position on the rail 161. The tools utilized are substantially identical to those used in the first described embodiment, i.e., each has a dovetail groove which is engaged with the dovetail track on the trolley or the tool mount and each also has a dovetail at one end for engagement by the dovetail groove in the slider 145. A suitable locking device fastens the tool to the trolley and similar locking devices are provided for locking the trolleys to the track sections 170 and 171.

The front web of the bed has a window 174 which has a shutter 175 (not shown in FIG. 5) which can be opened and closed by a suitable actuator.

Figure 5:
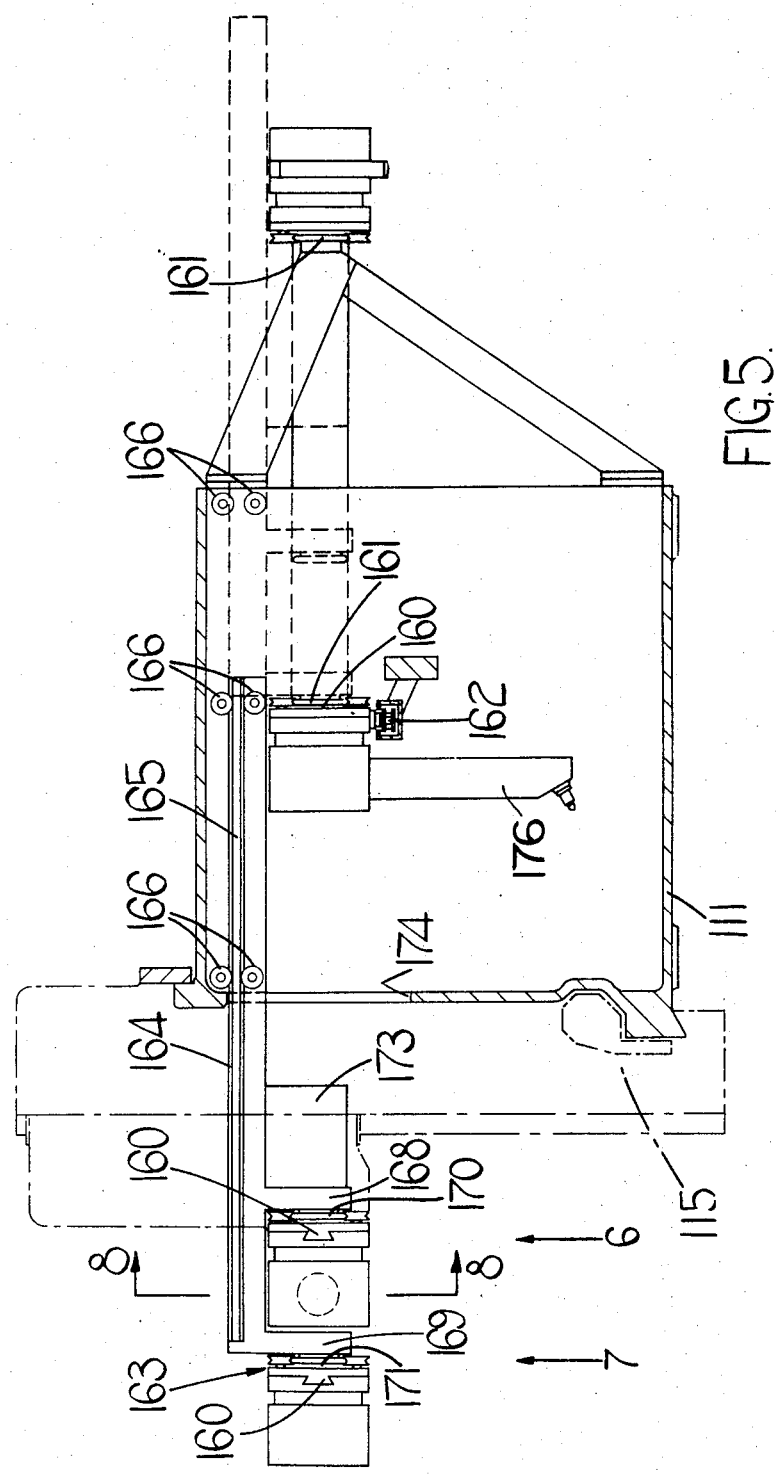
FIG. 5 is an enlarged fragmentary section on line 5—5 in FIG. 4, the view looking in the direction of the arrows.
Figure 6:
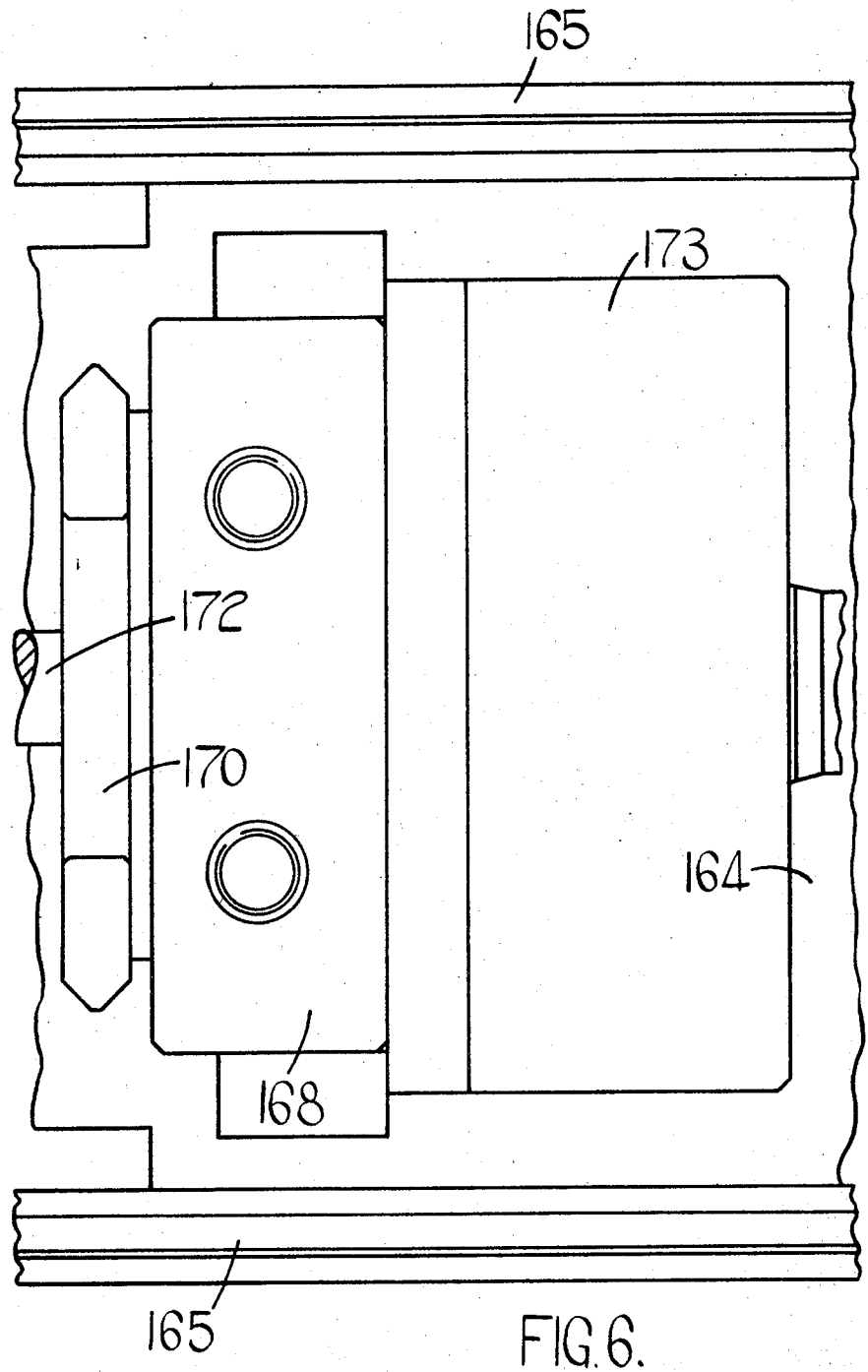
FIGS. 6 and 7 are views on arrows 6 and 7 in FIG. 5.
Figure 7:
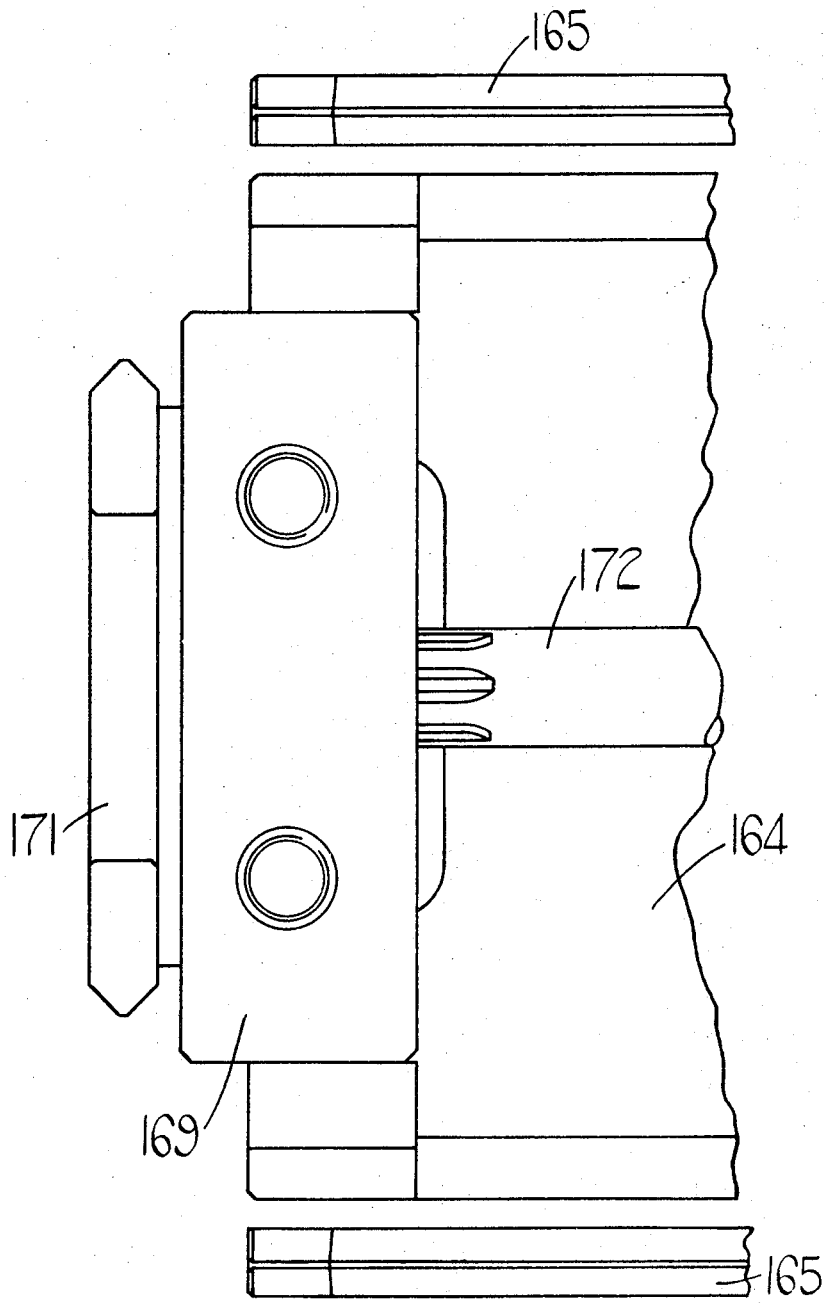

The arrangement is such that any long tools stored in the magazine hang downwardly like tool 176 shown in FIG. 5. The window 174, however, extends horizontally and it is therefore necessary to turn the trolley 160 on which the tool is stored before it can be moved through the window.

During tool selection, one of the two rail sections 170, 171 is placed in the gap in the rail 161 and the chain 162 is driven until the next tool required is found and arrested on the rail section 170 or 171. The beam 164 is then advanced on rotation of the stop drum to a position such that the tool on the rail section 170 or 171 is clear of the remaining tools in the magazine. The two rail sections 170 and 171 are then turned through 90° and the mechanism then dwells in that position until the machining operation currently in progress is completed. When this operation is complete, the saddle is moved to its appropriate tool exchange position and the shutter 175 of the window 174 is then opened. The stop drum is then indexed again and the beam moves forwardly to bring the one of the rail sections 170, 171 which carries the empty trolley belonging to the tool currently on the tool mount, into the tool transfer position.

The slide 115 is then moved vertically to the appropriate tool transfer position, after which the tool on the tool mount means is released and indexed through 90°, if necessary. The tool on the tool mount means is then pushed on to the empty trolley by the slider 145 and the beam is then moved to bring the other of the rail sections 170 and 171 to the tool transfer position. The orientation and arrangement of the dovetails on the shrouds allows that on the tool just transferred to a trolley to be disengaged from the slider and that on the other trolley to become engaged with the slider 145 as a result of this movement. The slider is then moved back to its original position, thus transferring the new tool to the tool mount means. If required, the piston of the tool mount means is now indexed and if no indexing is required, the slide is moved vertically clear of the lug 169 before the tool is clamped and the beam 164 is withdrawn back into the bed 111. The beam is arrested at a position with the lug 168 or 169 now bearing a tool in front of the rail 161 and the rail sections 170, 171 are indexed before the beam completes its journey to align the rail section carrying the trolley with the used tool thereon into alignment with the rail 164. Meanwhile, the shutter 175 is closed and the new machining operation can commence.

The above described embodiment provides the same advantages as those mentioned in respect of the first described example, except that the tool transfer mechanism is rather more complex. This, is offset, however, by increased capacity for different tools.

Having thus described our invention what we claim as new and desire to secure by Letters Patent is:

1. A machine tool including a slide structure, tool mount means movably mounted on said slide structure for receiving tools for operating on a workpiece, a magazine for receiving a plurality of different tools for transfer to the tool mount means, said magazine including a plurality of tool carrying devices, each having thereon a track section with which a tool having a portion of complementary section can be interlockingly engaged and the tool mount means having a corresponding track section alignable with the track section on a selected tool carrying device, tool transfer means including a transfer member movable in a direction parallel to said alignable track sections and provided with a further track arrangement extending substantially perpendicularly to the alignable track sections and interlockingly engageable with a further complementary portion of the tool, a further track section on said slide structure alignable with the track sections on a tool carrying device and the tool mount means and slidably supporting said transfer member, and said tool mount means including a piston movable in a direction perpendicular to the direction in which said further track section on the slide structure extends, said piston having thereon the track section of the tool mount means, whereby for a tool change, the track sections and track portions of the tool carrying device, the slide structure and the piston of the tool mount means are aligned and define a continuous track along which the tool carrying device is slid from the magazine to the working position.

2. The machine tool as claim 1 in which said alignable track sections are of dovetail configuration in cross-section.

3. A machine tool including a slide structure, tool mount means movably mounted on said slide structure for receiving tools for operating on a workpiece, a magazine for receiving a plurality of different tools for transfer to the tool mount means, said magazine including a plurality of tool carrying devices, each having thereon a track section with which a tool having a portion of complementary section can be interlockingly engaged and the tool mount means having a corresponding track section alignable with the track section on a selected tool carrying device, tool transfer means including a transfer member movable in a direction parallel to said alignable track sections and provided with a further track arrangement extending substantially perpendicularly to the alignable track sections and interlockingly engageable with a further complementary portion of the tool, a further track section on said slide structure alignable with the track sections on a tool carrying device and the tool mount means and slidably supporting said transfer member, and said tool mount means including a piston movable in a direction perpendicular to the direction in which said further track section on the slide structure extends, said piston having thereon the track section of the tool mount means and a piston movable in a direction parallel to the direction in which said further track arrangement extends.

4. The machine tool as claimed in claim 3 in which said tool mount means includes a toothed locating device engageable with a complementary toothed locating device on a tool by means of movement of said piston.

5. The machine tool as claimed in claim 3 in which said magazine comprises a disc carrying said tool-carrying devices and mounted on the machine tool for rotation to present a selected tool carrying device to a tool transfer location.

6. The machine tool as claimed in claim 5 in which the track sections of all the tool-carrying devices are parallel to the rotary axis of said disc.

7. The machine tool as claimed in claim 6 in which said slide structure comprises a saddle movable along a bed and a slide movable along a guideway on the saddle in a direction perpendicular to the direction in which the saddle is movable along the bed, the magazine being mounted on said saddle, and the tool mount means and the tool transfer means being mounted on the slide.

8. A machine tool including a frame, tool mount means movably mounted on said frame for receiving tools for operating on a workpiece, a magazine for receiving a plurality of different tools for transfer to the tool mount means, said magazine including a plurality of tool carrying devices, each having thereon a track section with which a tool having a portion of complementary section can be interlockingly engaged and the tool mount means having a corresponding track section alignable with the track section on a selected tool carrying device, tool transfer means including a transfer member movable in a direction parallel to said alignable track sections and provided with a further track arrangement extending substantially perpendicularly to the alignable track sections and interlockingly engageable with a further complementary portion of the tool, the magazine comprising a rail mounted on the frame and extending in a path having a gap therein and along which said tool carrying devices are movable, said tool transfer means including a rail section for closing said gap and means for displacing said rail section to a tool transfer position for alignment of the track section on a tool-carrying device on said rail section with the track section of the tool mount means.

9. A machine tool including a slide structure, tool mount means movably mounted on said slide structure for receiving tools for operating on a workpiece, a magazine for receiving a plurality of different tools for transfer to the tool mount means, said magazine including a plurality of tool carrying devices, each having thereon a track section with which a tool having a portion of complementary sections can be interlockingly engaged and the tool mount means having a corresponding track section alignable with the track section on a selected tool carrying device, tool transfer means including a transfer member movable in a direction parallel to said alignable track sections and provided with a further track arrangement extending substantially perpendicularly to the alignable track section and interlockingly engageable with a further complementary portion of the tool, a further track section on said slide structure alignable with the track sections on a tool carrying device and the tool mount means and slidably supporting said transfer member, said tool mount means including a piston movable in a direction perpendicular to the direction in which said further track section on the slide structure extends, said piston having thereon the track section of the tool mount means, the magazine comprising a rail mounted on the slide structure and extending in a substantially closed path along which said tool carrying devices are movable, said tool transfer means including a rail section completing said closed path and means for displacing said rail section to a tool transfer position for alignment of the track section on a tool carrying device on said rail section with the rail section of the tool mount means.

10. The machine tool as claimed in claim 9 in which the tool transfer means comprises a pair of said rail sections in spaced parallel relationship movable between a position in which one rail section completes said rail, a position in which the other rail section completes the rail, a position in which said one rail section is at said tool transfer position and a position in which said other rail section is at said tool transfer position.

11. The machine tool as claimed in claim 9 further comprising means for angularly moving said rail sections about an axis parallel to the direction of movement of said rail sections to and from said tool transfer position.

12. The machine tool as claimed in claim 11 in which the rail extends behind a bed on which said slide structure is carried, said bed having a window through which said rail sections are moved to and from the tool transfer position, said means for angularly moving said rail sections being operative when each of said rail sections occupies a position intermediate said window and the rail.

* * * * *